US012462958B2

(12) United States Patent
Abe et al.

(10) Patent No.: US 12,462,958 B2
(45) Date of Patent: Nov. 4, 2025

(54) METHOD OF PRODUCING PHOSPHATE-COATED SmFeN-BASED ANISOTROPIC MAGNETIC POWDER AND PHOSPHATE-COATED SmFeN-BASED ANISOTROPIC MAGNETIC POWDER

(71) Applicant: NICHIA CORPORATION, Anan (JP)

(72) Inventors: Masahiro Abe, Tokushima (JP); Satoshi Yamanaka, Tokushima (JP); Shuichi Tada, Komatsushima (JP); Kenta Iwai, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/146,752

(22) Filed: Dec. 27, 2022

(65) Prior Publication Data

US 2023/0207166 A1 Jun. 29, 2023

(30) Foreign Application Priority Data

Dec. 27, 2021 (JP) ................................ 2021-212678

(51) Int. Cl.

*H01F 1/059* (2006.01)
*B22F 1/142* (2022.01)
*B22F 1/145* (2022.01)
*B22F 1/16* (2022.01)
*H01F 41/02* (2006.01)

(52) U.S. Cl.

CPC .............. *H01F 1/059* (2013.01); *B22F 1/142* (2022.01); *B22F 1/145* (2022.01); *B22F 1/16* (2022.01); *H01F 41/026* (2013.01); *B22F 2201/03* (2013.01); *B22F 2301/45* (2013.01); *B22F 2302/45* (2013.01); *B22F 2998/10* (2013.01)

(58) Field of Classification Search

CPC .. B22F 1/142; B22F 1/145; B22F 1/16; B22F 2201/03; B22F 2301/45; B22F 2998/10; H01F 1/059; H01F 1/0596; H01F 1/061; H01F 41/026

See application file for complete search history.

(56) References Cited

U.S. PATENT DOCUMENTS

| | | | | |
|---|---|---|---|---|
| 2011/0314913 | A1* | 12/2011 | De Los Santos | G01P 15/0894 73/514.24 |
| 2011/0315913 | A1* | 12/2011 | Shigeoka | C22C 33/0278 252/62.51 R |
| 2013/0071682 | A1* | 3/2013 | Borysenko | C09C 1/0081 252/387 |
| 2020/0098497 | A1* | 3/2020 | Sakuma | C22C 1/0433 |

FOREIGN PATENT DOCUMENTS

| | | | | |
|---|---|---|---|---|
| JP | 2014160794 A | | 9/2014 | |
| JP | 2017210662 A | * | 11/2017 | |
| JP | 2020053437 A | | 4/2020 | |
| JP | 2020056101 A | | 4/2020 | |
| JP | 2021105192 A | | 7/2021 | |
| JP | 2022010511 A | | 1/2022 | |
| WO | WO-2010071111 A1 | * | 6/2010 | B22F 1/0062 |

* cited by examiner

*Primary Examiner* — Humera N. Sheikh

(74) *Attorney, Agent, or Firm* — Hunton Andrews Kurth LLP

(57) ABSTRACT

A method of producing a phosphate-coated SmFeN-based anisotropic magnetic powder, the method including performing a phosphate treatment including adding an inorganic acid to a slurry containing a raw material SmFeN-based anisotropic magnetic powder, water, a phosphate compound, and a rare earth compound so that the slurry is adjusted to have a pH of at least 1 and not higher than 4.5 to obtain a phosphate-coated SmFeN-based anisotropic magnetic powder having a surface coated with a phosphate.

17 Claims, No Drawings

METHOD OF PRODUCING PHOSPHATE-COATED SmFeN-BASED ANISOTROPIC MAGNETIC POWDER AND PHOSPHATE-COATED SmFeN-BASED ANISOTROPIC MAGNETIC POWDER

CROSS-REFERENCE TO RELATED PATENT APPLICATION

This application claims priority to Japanese Patent Application No. 2021-212678 filed on Dec. 27, 2021. The disclosure of Japanese Patent Application No. 2021-212678 is hereby incorporated by reference in its entirety.

BACKGROUND

The present disclosure relates to a method of producing a phosphate-coated SmFeN-based anisotropic magnetic powder and a phosphate-coated SmFeN-based anisotropic magnetic powder.

SmFeN-based anisotropic magnetic powders are known to have higher coercive force when their surfaces are coated with phosphates. For example, JP 2020-056101 A discloses a method of adding a pH-adjusted phosphate treatment liquid containing an orthophosphoric acid to a slurry containing a SmFeN-based anisotropic magnetic powder and water as a solvent to coat the surface of the SmFeN-based anisotropic magnetic powder with the phosphate.

JP 2017-210662 A discloses a method of adding a pH-adjusted phosphate treatment liquid to a slurry containing a SmFeN-based anisotropic magnetic powder having a large particle size and an organic solvent, and then milling the SmFeN-based anisotropic magnetic powder into smaller particles while coating the surface of the SmFeN-based anisotropic magnetic powder with the phosphate.

JP 2014-160794 A discloses that the slow oxidation of a phosphate-coated SmFeN-based anisotropic magnetic powder increases the coercive force of the magnetic powder.

SUMMARY

Embodiments of the present disclosure aim to provide a method of producing a phosphate-coated SmFeN-based anisotropic magnetic powder that has a much higher coercive force and a phosphate-coated SmFeN-based anisotropic magnetic powder.

Exemplary embodiments of the present disclosure relate to a method of producing a phosphate-coated SmFeN-based anisotropic magnetic powder, the method including performing a phosphate treatment including adding an inorganic acid to a slurry containing a raw material SmFeN-based anisotropic magnetic powder, water, a phosphate compound, and a rare earth compound so that the slurry is adjusted to have a pH of at least 1 and not higher than 4.5 to obtain a phosphate-coated SmFeN-based anisotropic magnetic powder having a surface coated with a phosphate.

Exemplary embodiments of the present disclosure relate to a phosphate-coated SmFeN-based anisotropic magnetic powder, having a DSC exothermic onset temperature of 170° C. or higher, having a phosphate content of higher than 0.5% by mass, and containing at least one rare earth element selected from the group consisting of Ce, Nd, and Dy.

According to the above embodiments, it is possible to provide a method of producing a phosphate-coated SmFeN-based anisotropic magnetic powder that has a much higher coercive force and a phosphate-coated SmFeN-based anisotropic magnetic powder.

DETAILED DESCRIPTION

Embodiments of the present disclosure are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved. Moreover, numerical ranges indicated using "to" refer to ranges including the numerical values before and after "to" as the minimum and maximum, respectively.

Method of Producing Phosphate-Coated SmFeN-Based Anisotropic Magnetic Powder A method of producing a phosphate-coated SmFeN-based anisotropic magnetic powder according to the present embodiments includes performing a phosphate treatment including adding an inorganic acid to a slurry containing a raw material SmFeN-based anisotropic magnetic powder, water, a phosphate compound, and a rare earth compound so that the slurry is adjusted to have a pH of at least 1 and not higher than 4.5 to obtain a phosphate-coated SmFeN-based anisotropic magnetic powder having a surface coated with a phosphate.

Phosphate Treatment Step

In the phosphate treatment step, an inorganic acid may be added to a slurry containing the raw material SmFeN-based anisotropic magnetic powder, water, a phosphate compound, and a rare earth compound so that the slurry is adjusted to have a pH of at least 1 and not higher than 4.5, thereby obtaining the phosphate-coated SmFeN-based anisotropic magnetic powder having a surface coated with a phosphate.

The phosphate-coated SmFeN-based anisotropic magnetic powder can be formed by reacting the metal component (for example, iron, samarium) of the SmFeN-based anisotropic magnetic powder and the phosphate component of the phosphate compound to precipitate a phosphate (for example, iron phosphate, samarium phosphate) on the surface of the SmFeN-based anisotropic magnetic powder. Further, as the rare earth compound is also present in the slurry, the rare earth compound may bind to the surface of the SmFeN-based anisotropic magnetic powder, so that a phosphate of the rare earth element can be precipitated. Moreover, as water is used as a solvent according to the present embodiments, a phosphate having a small particle size is precipitated as compared to when an organic solvent is used. Thus, the resulting phosphate-coated SmFeN-based anisotropic magnetic powder has a dense coating.

The amount of the SmFeN-based anisotropic magnetic powder in the slurry may be, for example, at least 1% by mass and not more than 50% by mass. In view of productivity, the amount is preferably at least 5% by mass and not more than 20% by mass. The amount of the phosphate component ($PO_4$) in the slurry as calculated as $PO_4$ is, for example, at least 0.01% by mass and not more than 10% by mass. In view of reactivity of the phosphate component and productivity, the amount is preferably at least 0.05% by mass and not more than 5% by mass.

The rare earth compound may include or be any compound that contains at least one rare earth element, but may include or is preferably at least one compound that can generate rare earth ions in a slurry containing water as a solvent, such as a rare earth hydroxide, a rare earth chloride, a rare earth sulfate, a rare earth nitrate, or a rare earth acetate, or a combination thereof.

Examples of the rare earth element(s) contained in the rare earth compound include Ce, Sm, Nd, Dy, Y, La, and Pr, with Ce, Sm, Nd, and Dy being preferred.

A rare earth hydroxide or a rare earth chloride is preferred among the rare earth compounds mentioned above.

The rare earth hydroxide is more preferably a rare earth hydroxide represented by the following formula (1):

$$R—(OH)_x \quad (1),$$

wherein R is Ce, Nd, Sm, or Dy, and x is 1, 2, 3, or 4. Particularly preferred are $Ce(OH)_3$, $Nd(OH)_3$, $Sm(OH)_3$, and $Dy(OH)_3$. Such a rare earth hydroxide may be dissolved in the slurry and present in the form of rare earth ions. The rare earth hydroxide may be prepared from a rare earth chloride at a pH of at least 4 but not higher than 10, for example.

The rare earth chloride is more preferably a rare earth chloride represented by the following formula (2):

$$R—(Cl)_x \quad (2),$$

wherein R is Ce, Nd, Sm, or Dy, and x is 1, 2, 3, or 4. Particularly preferred are $CeCl_3$, $NdCl_3$, $SmCl_3$, and $DyCl_3$. Such a rare earth chloride may be dissolved in the slurry and present in the form of rare earth ions.

The rare earth element content of the phosphate-coated SmFeN-based anisotropic magnetic powder obtained in the phosphate treatment step may be, for example, 0.25% by mass or less, preferably 0.2% by mass or less, more preferably 0.18% by mass or less, still more preferably 0.15% by mass or less. When the content is 0.25% by mass or less, the magnetic powder tends to have a much higher coercive force. When the content is 0.2% by mass or less, the resulting magnetic powder may have a much higher resistance to hot water. The lower limit of the rare earth element content is not limited, but may generally be 0.01% by mass or more, preferably 0.03% by mass or more. The rare earth element content of the magnetic powder can be measured by ICP atomic emission spectroscopy (ICP-AES).

In the phosphate treatment step, most of the rare earth element derived from the rare earth compound contained in the slurry may attach to the SmFeN-based anisotropic magnetic powder. Thus, in order to adjust the amount of the rare earth element within the range indicated above, the amount of the rare earth compound to be added in the slurry may be adjusted so that the amount of the rare earth element contained in the rare earth compound is 0.25% by mass or less, preferably 0.2% by mass or less, more preferably 0.18% by mass or less, still more preferably 0.15% by mass or less, relative to the mass of the phosphate-coated SmFeN-based anisotropic magnetic powder obtained in the phosphate treatment step. When the amount of the rare earth element contained in the rare earth compound is 0.25% by mass or less, the magnetic powder tends to have a much higher coercive force. When the amount is 0.2% by mass or less, the resulting magnetic powder may have a much higher resistance to hot water. Moreover, the lower limit of the amount of the rare earth element in the rare earth compound is not limited, but may generally be 0.01% by mass or more, preferably 0.03% by mass or more. The rare earth element may precipitate as a phosphate on the surface of the SmFeN-based anisotropic magnetic powder.

An aqueous phosphate solution may be prepared by mixing a phosphate compound with water. Examples of the phosphate compound include inorganic phosphate compounds such as orthophosphoric acid, sodium dihydrogen phosphate, sodium monohydrogen phosphate, ammonium dihydrogen phosphate, ammonium monohydrogen phosphate, zinc phosphate, calcium phosphate, and other phosphates, hypophosphorous acid, hypophosphites, pyrophosphoric acid, and polyphosphoric acid; and organic phosphoric acids, and salts thereof. These may be used alone or in combinations of two or more. To enhance the water resistance and corrosion resistance of the coating and the magnetic properties of the magnetic powder, additives may also be added including, for example, oxoacid salts such as molybdates, tungstates, vanadates, and chromates; oxidizing agents such as sodium nitrate and sodium nitrite; and chelating agents such as EDTA.

The phosphate concentration (calculated as $PO_4$) in the aqueous phosphate solution is, for example, at least 5% by mass and not more than 50% by mass. In view of the solubility and storage stability of the phosphate compound and ease of chemical treatment, the concentration is preferably at least 10% by mass and not more than 30% by mass. The pH of the aqueous phosphate solution is, for example, at least 1 and not higher than 4.5, but it is preferably at least 1.5 and not higher than 4 to easily control the precipitation rate of the phosphate. The pH may be adjusted using dilute hydrochloric acid, dilute sulfuric acid, or the like.

The slurry containing a SmFeN-based anisotropic magnetic powder, water, a phosphate compound, and a rare earth compound may be prepared by any method which may include mixing the components in any order. Preferably, a SmFeN-based anisotropic magnetic powder, water, and a rare earth compound are mixed in advance, and then an aqueous phosphate solution containing a phosphate compound is added to the mixture. Mixing the SmFeN-based anisotropic magnetic powder, water, and rare earth compound in advance may facilitate bonding of the rare earth compound to the surface of the SmFeN-based anisotropic magnetic powder to increase the phosphate content of the final SmFeN-based anisotropic magnetic powder. When the SmFeN-based anisotropic magnetic powder, water, and rare earth compound are mixed in advance, the mixture obtained by mixing them may be stirred for preferably at least five minutes, more preferably at least 10 minutes before adding thereto the aqueous phosphate solution containing a phosphate compound. In this case, the pH during the mixing and stirring may be at least 4 but not higher than 10, preferably at least 5 but not higher than 8.

In the phosphate treatment step, an inorganic acid is added to adjust the pH of the slurry to at least 1 but not higher than 4.5, preferably at least 1.6 but not higher than 3.9, more preferably at least 2 but not higher than 3. When the pH is lower than 1, aggregation of the phosphate-coated SmFeN-based anisotropic magnetic powder particles tends to occur starting from the locally highly precipitated phosphate, resulting in lower coercive force. When the pH is higher than 4.5, the amount of the precipitated phosphate tends to decrease, resulting in insufficient coating and thus lower coercive force. Examples of the inorganic acid to be added include hydrochloric acid, nitric acid, sulfuric acid, boric acid, and hydrofluoric acid. In the phosphate treatment step, the inorganic acid may be added as required to adjust the pH within the above-mentioned range. Although the inorganic acid is used in view of liquid waste disposal, an organic acid may be used together depending on the purpose. Examples of the organic acid include acetic acid, formic acid, and tartaric acid. A mixture of the inorganic acid and the organic acid may also be used.

The lower limit of the phosphate content of the phosphate-coated SmFeN-based anisotropic magnetic powder obtained in the phosphate treatment step is preferably higher than 0.5% by mass, more preferably 0.55% by mass or higher, still more preferably 0.75% by mass or higher. The upper limit of the phosphate content is preferably 4.5% by mass or lower, more preferably 2.5% by mass or lower, still more preferably 2% by mass or lower. When the phosphate content is 0.5% by mass or lower, the effect of the phosphate coating tends to decrease. When the phosphate content is higher than 4.5% by mass, the phosphate-coated SmFeN-based anisotropic magnetic powder particles tend to aggregate, resulting in lower coercive force. Here, the phosphate content of the magnetic powder is determined by ICP atomic emission spectroscopy (ICP-AES) converted to an amount of $PO_4$ molecule (i.e., the amount calculated as phosphate ions).

The adjustment of the slurry containing a SmFeN-based anisotropic magnetic powder, water, a phosphate compound, and a rare earth compound to have a pH within the range of at least 1 but not higher than 4.5 may be performed for at least 10 minutes. To reduce the thin parts of the coating, the adjustment is preferably performed for at least 30 minutes. In the pH maintenance, as the pH initially increases rapidly, the inorganic acid for pH control should be introduced at short intervals. Then, as the coating proceeds, the pH changes gently, and thus the inorganic acid may be introduced at longer intervals, which allows one to determine the end point of the reaction.

Oxidation Step after Phosphate Treatment

In the oxidation step after phosphate treatment, the phosphate-coated SmFeN-based anisotropic magnetic powder obtained in the phosphate treatment step may be oxidized by heat-treating the phosphate-coated SmFeN-based anisotropic magnetic powder at a temperature of at least 150° C. but not higher than 330° C. in an oxygen-containing atmosphere. When the phosphate-coated SmFeN-based anisotropic magnetic powder is heat-treated at a high temperature of at least 150° C. but not higher than 330° C. in an oxygen-containing atmosphere, the surface of the base material SmFeN-based anisotropic magnetic powder coated with a phosphate may be oxidized to form a thick iron oxide layer which tends to enhance the hot water resistance of the phosphate-coated SmFeN-based anisotropic magnetic powder.

The oxidation step after phosphate treatment may be carried out by heat-treating the phosphate-coated SmFeN-based anisotropic magnetic powder in an oxygen-containing atmosphere. The reaction atmosphere preferably contains oxygen in an inert gas such as nitrogen or argon. The oxygen concentration is preferably at least 3% but not more than 21%, more preferably at least 3.5% but not more than 10%. During the oxidation reaction, gas exchange is preferably performed at a flow rate of at least 2 L/min but not higher than 10 L/min per 1 kg of the magnetic powder.

The heat treatment temperature during the oxidation step after phosphate treatment is preferably at least 150° C. but not higher than 330° C., more preferably at least 200° C. but not higher than 330° C., still more preferably at least 200° C. but not higher than 250° C., particularly preferably at least 210° C. but not higher than 230° C. When the temperature is lower than 150° C., the formation of an iron oxide layer tends to be insufficient, resulting in lower resistance to hot water. When the temperature is higher than 330° C., the formation of an iron oxide layer tends to be excessive, resulting in lower coercive force. The heat treatment time is preferably at least 3 hours but not more than 10 hours.

The oxidation step after phosphate treatment is preferably performed so that the phosphate coating on the surface of the SmFeN-based anisotropic magnetic powder has a first region having a Sm atomic concentration which is higher than the Sm atomic concentration of the SmFeN-based anisotropic magnetic powder and which is at least 0.5 times but not more than 4 times the Fe atomic concentration of the first region. The Sm atomic concentration of the first region may be at least 1.02 times, preferably at least 1.05 times, more preferably at least 1.1 times, still more preferably at least 1.2 times the Sm atomic concentration of the SmFeN-based anisotropic magnetic powder. The Sm atomic concentration of the first region may be not higher than 3 times the Sm atomic concentration of the SmFeN-based anisotropic magnetic powder. The Sm atomic concentration of the first region is preferably at least 0.6 times but not more than 3.5 times, more preferably at least 0.7 times but not more than 3 times the Fe atomic concentration of the first region. Here, the atomic concentrations (atm %) of the SmFeN-based anisotropic magnetic powder and the first region can be determined by averaging the atomic concentrations (atm %) of the regions in a STEM-EDX line scan.

Silica Treatment Step

The SmFeN-based anisotropic magnetic powder obtained after the phosphate treatment may optionally be subjected to a silica treatment. The formation of a silica thin film on the magnetic powder enhances oxidation resistance. The silica thin film may be formed, for example, by mixing an alkyl silicate, the phosphate-coated SmFeN-based anisotropic magnetic powder, and an alkali solution.

Silane Coupling Treatment Step

The magnetic powder obtained after the silica treatment may be further treated with a silane coupling agent. When the magnetic powder with a silica thin film formed thereon is subjected to a silane coupling treatment, a coupling agent film is formed on the silica thin film, which improves the magnetic properties of the magnetic powder as well as wettability between the magnetic powder and the resin and the magnet strength. Any silane coupling agent may be used and may be selected depending on the type of resin. Examples of the silane coupling agent include 3-aminopropyltriethoxysilane, γ-(2-aminoethyl)aminopropyltrimethoxysilane, γ-(2-aminoethyl)aminopropylmethyldimethoxysilane, γ-methacryloxypropyltrimethoxysilane, γ-methacryloxypropylmethyldimethoxysilane, N-β-(N-vinylbenzylaminoethyl)-γ-aminopropyltrimethoxysilane hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethylenedisilazane, γ-anilinopropyltrimethoxysilane, vinyltrimethoxysilane, octadecyl[3-(trimethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, vinyltrichlorosilane, vinyltris(β-methoxyethoxy)silane, vinyltriethoxysilane, β-(3,4-epoxycyclohexyl)ethyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, ureidopropyltriethoxysilane, γ-isocyanatopropyltriethoxysilane, polyethoxydimethylsiloxane, polyethoxymethylsiloxane, bis(trimethoxysilylpropyl)amine, bis(3-triethoxysilylpropyl) tetrasulfane, γ-isocyanatopropyltrimethoxysilane, vinylmethyldimethoxysilane, 1,3,5-N-tris(3-trimethoxysilylpropyl)isocyanurate, t-butyl carbamate trialkoxysilane, and N-(1,3-dimethylbutylidene)-3-(triethoxysilyl)-1-propaneamine. These silane coupling agents may be used alone or in combinations of two or more. The amount of the silane coupling agent added per 100 parts by mass of the magnetic powder is preferably at least 0.2 parts by mass but not more than 0.8 parts by mass, more preferably at least 0.25 parts by mass but not more than 0.6 parts by mass. When the amount is less than 0.2 parts by mass, the effect of the silane coupling agent tends to be small. When the amount is more than 0.8 parts by mass, the magnetic properties of the magnetic powder or magnet tend to decrease due to aggregation of the magnetic powder.

The SmFeN-based anisotropic magnetic powder obtained after the phosphate treatment step, oxidation step, silica treatment, or silane coupling treatment may be filtered, dehydrated, and dried in a usual manner.

Phosphate-Coated SmFeN-Based Anisotropic Magnetic Powder

The phosphate-coated SmFeN-based anisotropic magnetic powder according to the present embodiments has a DSC exothermic onset temperature of 170° C. or higher, has a phosphate content of higher than 0.5% by mass, and contains at least one rare earth element selected from the group consisting of Ce, Nd, and Dy. Here, the phosphate-coated SmFeN-based anisotropic magnetic powder can be obtained by the method described above.

The amount of the at least one rare earth element selected from the group consisting of Ce, Nd, and Dy in the phosphate-coated SmFeN-based anisotropic magnetic powder may be, for example, 0.25% by mass or less, preferably 0.2% by mass or less, more preferably 0.18% by mass or less, still more preferably 0.15% by mass or less. When the amount is 0.25% by mass or less, the magnetic powder tends to have a much higher coercive force. When the amount is 0.2% by mass or less, the resulting magnetic powder may have a much higher resistance to hot water. The lower limit of the amount of the rare earth element is not limited, but may generally be 0.01% by mass or more, preferably 0.03% by mass or more. The amount of the rare earth element in the magnetic powder can be measured by ICP atomic emission spectroscopy (ICP-AES).

The DSC exothermic onset temperature of the phosphate-coated SmFeN-based anisotropic magnetic powder is 170° C. or higher, preferably 200° C. or higher, more preferably 260° C. or higher. The DSC exothermic onset temperature indicates an overall evaluation of the properties of the phosphate coating, including density, thickness, and oxidation resistance. A high coercive force can be obtained when the DSC exothermic onset temperature is 170° C. or higher. Here, the DSC exothermic onset temperature can be measured under the conditions described in EXAMPLES.

The phosphate-coated SmFeN-based anisotropic magnetic powder preferably has a XRD diffraction pattern in which the ratio (I)/(II) of the diffraction peak intensity (I) of the (110) plane of αFe to the diffraction peak intensity (II) of the (300) plane of the SmFeN-based anisotropic magnetic powder is not higher than $2.0\times10^{-2}$, more preferably not higher than $1.0\times10^{-2}$. The diffraction peak intensity (I) of the (110) plane of αFe indicates the abundance of αFe as an impurity. A high coercive force can be obtained when the ratio (I)/(II) is not higher than $2.0\times10^{2}$. Here, the diffraction peak intensities in the XRD diffraction pattern may be measured using a powder X-ray crystal diffraction instrument (available from Rigaku Corporation, X-ray wavelength: CuKa1), and the measured diffraction peak intensity of the (110) plane of αFe may be divided by the diffraction peak intensity of the (300) plane of $Sm_2Fe_{17}N_3$ and then multiplied by 10,000 to obtain a value as an αFe peak height ratio. A lower αFe peak height ratio indicates a smaller amount of αFe as an impurity.

The phosphate-coated SmFeN-based anisotropic magnetic powder preferably has a carbon content of not higher than 1,000 ppm, more preferably not higher than 800 ppm. The carbon content indicates the amount of organic impurities in the phosphate. When the phosphate-coated SmFeN-based anisotropic magnetic powder having a carbon content higher than 1,000 ppm is exposed to a high temperature in the production of a bonded magnet, the organic impurities tend to be decomposed to form defects in the coating, resulting in lower coercive force. Here, the carbon content can be measured by a TOC method.

The phosphate content of the phosphate-coated SmFeN-based anisotropic magnetic powder is preferably higher than 0.5% by mass, more preferably 0.55% by mass or higher, still more preferably 0.75% by mass or higher. Moreover, the upper limit of the phosphate content is preferably 4.5% by mass or lower, more preferably 2.5% by mass or lower, still more preferably 2% by mass or lower. When the phosphate content is 0.5% by mass or lower, the effect of the phosphate coating tends to decrease. When the phosphate content is higher than 4.5% by mass, the phosphate-coated SmFeN-based anisotropic magnetic powder particles tend to aggregate, resulting in lower coercive force. Here, the phosphate content of the magnetic powder is determined by ICP atomic emission spectroscopy (ICP-AES) converted to an amount of $PO_4$ molecule.

In view of the coercive force of the phosphate-coated SmFeN-based anisotropic magnetic powder, the phosphate-coated SmFeN-based anisotropic magnetic powder preferably has a phosphate coating having a thickness of at least 10 nm but not more than 200 nm. Here, the thickness of the phosphate coating may be measured by composition analysis using a EDX line scan of a cross section of the phosphate-coated SmFeN-based anisotropic magnetic powder particles.

After undergoing the above-described oxidation step after phosphate treatment, the phosphate coating on the surface of the SmFeN-based anisotropic magnetic powder preferably has a first region having a Sm atomic concentration which is higher than the Sm atomic concentration of the SmFeN-based anisotropic magnetic powder and which is at least 0.5 times but not more than 4 times the Fe atomic concentration of the first region.

The Sm atomic concentration of the first region may be at least 1.02 times, preferably at least 1.05 times, more preferably at least 1.1 times, still more preferably at least 1.2 times the Sm atomic concentration of the SmFeN-based anisotropic magnetic powder. The Sm atomic concentration of the first region may be not more than 3 times the Sm atomic concentration of the SmFeN-based anisotropic magnetic powder. The Sm atomic concentration of the first region is preferably at least 0.6 times but not more than 3.5 times, more preferably at least 0.7 times but not more than 3 times the Fe atomic concentration of the first region. When the relationship between the Sm atomic concentration and Fe atomic concentration of the first region is within the range indicated above, the Fe atomic concentration in the vicinity of the surface of the SmFeN-based anisotropic magnetic powder is reduced while the amount of samarium phosphate having a low solubility in water increases, so that the water resistance tends to be further improved.

Here, the first region includes a layer that shows the highest phosphorus (P) peak in a STEM-EDX line scan of the phosphate-coated SmFeN-based anisotropic magnetic powder particles. The thickness of the first region may be at least 1 nm but not more than 200 nm, preferably at least 3 nm but not more than 100 nm. Here, the atomic concentrations (atm %) of the elements in the first region as well as a second region and a Mo-rich layer, which are described later, can be determined by averaging the atomic concentrations (atm %) of the regions in a STEM-EDX line scan.

The phosphate coating preferably further has a second region on the first region, in which the Sm atomic concentration of the second region is not more than ⅓ times the Fe atomic concentration of the second region. The Sm atomic concentration of the second region is more preferably not more than ⅕ times, still more preferably not more than 1/10 times the Fe atomic concentration of the second region. The Sm atomic concentration of the second region may be at least 0 times the Fe atomic concentration of the second region. Here, the second region includes a layer that shows the highest iron (Fe) peak in the phosphate coating in a STEM-EDX line scan of the phosphate-coated SmFeN-based anisotropic magnetic powder particles. The thickness of the second region may be at least 1 nm but not more than 200 nm, preferably at least 5 nm but not more than 100 nm. The phosphate coating having a second region on the first region as described above is reinforced by the iron-containing region even if it has a relatively thin part. Thus, the water resistance tends to be further improved.

The Fe atomic concentration of the second region is preferably at least 2 times, more preferably at least 3 times the Fe atomic concentration of the first region. The Fe atomic concentration of the second region is preferably not more than 10 times the Fe atomic concentration of the first region. Moreover, the Fe atomic concentration of the second region is preferably at least 0.25 times but not more than 1 time, more preferably at least 0.5 times but not more than 0.8 times the Fe atomic concentration of the base material SmFeN-based anisotropic magnetic powder. Here, the phosphorus (P) atomic concentration of the second region is preferably lower than the P atomic concentration of the first region. The P atomic concentration of the second region is preferably not more than ⅕ times, more preferably 1/10 times the P atomic concentration of the first region. When the second region has the above-mentioned P atomic concentration, the water resistance tends to be further improved.

When a molybdate is incorporated into the reaction slurry in the phosphate treatment step, the phosphate coating may have a Mo-rich layer in the first and second regions. Preferably, three Mo-rich layers are present in the phosphate coating; in other words, three molybdenum (Mo) peaks preferably appear in a STEM-EDX line scan of the phosphate-coated SmFeN-based anisotropic magnetic powder particles. Moreover, the Mo-rich layer may also be identified by STEM-EDX mapping. The Mo-rich layer is a region including a layer that shows a molybdenum (Mo) peak in a STEM-EDX line scan of the phosphate-coated SmFeN-based anisotropic magnetic powder particles. The thickness of the Mo-rich layer is preferably at least 1 nm but not more than 40 nm. The phosphate coating having three Mo-rich layers as described above tends to provide improved water resistance due to the structure with a larger number of layers.

The Mo atomic concentration of the Mo-rich layer is preferably at least 1.1 times but not more than 40 times, more preferably at least 2 times but not more than 20 times the Mo atomic concentration of the first region except for the Mo-rich layer. Moreover, the Mo atomic concentration of the Mo-rich layer is preferably at least 1.1 times but not more than 20 times, more preferably at least 2 times but not more than 10 times the Mo atomic concentration of the second region except for the Mo-rich layer. The Sm, Fe, and Mo atomic concentrations may be measured by composition analysis using a EDX line scan of the phosphate-coated SmFeN-based anisotropic magnetic powder particles.

Method of Producing SmFeN-Based Anisotropic Magnetic Powder

In the above-described method of producing a phosphate-coated SmFeN-based anisotropic magnetic powder, the SmFeN-based anisotropic magnetic powder to be used in the phosphate treatment step is not limited, but may suitably include or be, for example, a SmFeN-based anisotropic magnetic powder produced by a method including:

- mixing a solution containing Sm and Fe with a precipitant to obtain a precipitate containing Sm and Fe (precipitation step);
- firing the precipitate to obtain an oxide containing Sm and Fe (oxidation step);
- heat-treating the oxide in a reducing-gas-containing atmosphere to obtain a partial oxide (pretreatment step);
- reducing the partial oxide (reduction step); and
- nitriding alloy particles obtained in the reduction step (nitridation step).

Precipitation Step

In the precipitation step, a Sm raw material and a Fe raw material may be dissolved in a strong acid solution to prepare a solution containing Sm and Fe. When it is desired to obtain $Sm_2Fe_{17}N_3$ as the main phase, the molar ratio of Sm and Fe (Sm:Fe) is preferably 1.5:17 to 3.0:17, more preferably 2.0:17 to 2.5:17. A raw material such as La, W, Co, Ti, Sc, Y, Pr, Nd, Pm, Gd, Tb, Dy, Ho, Er, Tm, or Lu may be added to the solution.

Any Sm or Fe raw material which can be dissolved in a strong acid solution may be used. In view of availability, examples of the Sm raw material include samarium oxide, and examples of the Fe raw material include $FeSO_4$. The concentration of the solution containing Sm and Fe may be appropriately adjusted within a range in which the Sm raw material and the Fe raw material can be substantially dissolved in the acid solution. In view of solubility, the acid solution may include sulfuric acid.

The solution containing Sm and Fe may be reacted with a precipitant to obtain an insoluble precipitate containing Sm and Fe. Here, the solution containing Sm and Fe may be such that the solution contains Sm and Fe at the time of the reaction with a precipitant. For example, separate solutions containing a Sm raw material and a Fe raw material, respectively, may be prepared and dropwise added to be reacted with a precipitant. When separate solutions are prepared, the solutions may be appropriately adjusted within a range in which the respective raw materials can be substantially dissolved in an acid solution. The precipitant may be any alkali solution that can react with the solution containing Sm and Fe to give a precipitate. Examples include an aqueous ammonia solution and caustic soda, with caustic soda being preferred.

To easily control the particle properties of the precipitate, the precipitation reaction is preferably carried out by separately dropwise adding the solution containing Sm and Fe and the precipitant to a solvent such as water. A precipitate having a homogeneous element distribution, a sharp particle size distribution, and a uniform particle shape can be obtained by appropriately controlling the feeding rates of the solution containing Sm and Fe and the precipitant, the reaction temperature, the concentration of the reaction solution, the pH during the reaction, and other conditions. The use of such a precipitate enhances the magnetic properties of the magnetic powder as a final product. The reaction temperature may be 0° C. to 50° C., preferably 35° C. to 45° C. The concentration of the reaction solution as calculated as the total concentration of metal ions is preferably 0.65 mol/L to 0.85 mol/L, more preferably 0.7 mol/L to 0.84 mol/L. The pH during the reaction is preferably 5 to 9, more preferably 6.5 to 8.

The precipitate obtained in the precipitation step roughly determines the particle size, particle shape, and particle size distribution of the finally prepared magnetic powder. When the particle size of the prepared particles is measured with a wet laser diffraction particle size distribution analyzer, the size and distribution of the entire particles preferably substantially fall within the range of 0.05 to 20 μm, preferably 0.1 to 10 μm. Moreover, the average particle size of the precipitate is defined as the particle size corresponding to the 50th percentile of the cumulative undersize particle size distribution by volume, and is preferably within the range of 0.1 to 10 μm.

After separating the precipitate, the separated precipitate is preferably subjected to desolvation in order to inhibit changes in particle size distribution, particle size, or other properties and aggregation of the precipitate upon evaporation of the solvent caused when the precipitate is re-dissolved in the remaining solvent during the heat treatment in the subsequent oxidation step. Specifically, when the solvent used is water, for example, the desolvation may be carried out by drying in an oven at 70° C. to 200° C. for 5 to 12 hours.

The precipitation step may be followed by separating and washing the precipitate. The washing step may be appropriately performed until the conductivity of the supernatant solution reaches 5 $mS/m^2$ or less. The step of separating the precipitate may be carried out, for example, by mixing the precipitate with a solvent (preferably water) and subjecting the mixture to filtering, decantation, or other separation processes.

Oxidation Step

In the oxidation step, the precipitate formed in the precipitation step may be fired to obtain an oxide containing Sm and Fe. For example, the precipitate may be converted into an oxide by heat treatment. The heat treatment of the precipitate needs to be performed in the presence of oxygen, for example in an air atmosphere. Moreover, since the presence of oxygen is necessary, the non-metal portion of the precipitate preferably contains an oxygen atom.

The heat treatment temperature in the oxidation step (hereinafter, oxidation temperature) is not limited, but it is preferably 700° C. to 1,300° C., more preferably 900° C. to 1,200° C. When the heating treatment temperature is lower than 700° C., oxidation tends to be insufficient. When the heating treatment temperature is higher than 1,300° C., the resulting magnetic powder tends not to have the desired shape, average particle size, or particle size distribution. The heat treatment time is not limited either, but it is preferably one to three hours.

The thus formed oxide is oxide particles in which Sm and Fe have been microscopically sufficiently mixed, and the shape, particle size distribution, and other properties of the precipitate have been reflected.

Pretreatment Step

In the pretreatment step, the oxide containing Sm and Fe may be heat-treated in a reducing gas-containing atmosphere to obtain a partial oxide which is a partially reduced oxide.

Herein, the partial oxide refers to a partially reduced oxide. The oxygen concentration of the oxide is not limited, but it is preferably not more than 10% by mass, more preferably not more than 8% by mass. When the concentration is more than 10% by mass, heat generation caused by reduction with Ca as a reducing agent tends to become higher in the reduction step, increasing the firing temperature enough to form abnormally grown particles. Herein, the oxygen concentration of the partial oxide may be measured by non-dispersive infrared spectroscopy (ND-IR).

The reducing gas may be appropriately selected from hydrogen ($H_2$), hydrocarbon gases such as carbon monoxide (CO) and methane ($CH_4$), and other gases. In view of the cost, hydrogen gas is preferred. The flow rate of the gas may be appropriately adjusted within a range that does not cause scattering of the oxide. The heat treatment temperature during the pretreatment step (hereinafter, pretreatment temperature) is in the range of at least 300° C. but not higher than 950° C., and is preferably 400° C. or higher, more preferably 750° C. or higher, but preferably lower than 900° C. When the pretreatment temperature is 300° C. or higher, the oxide containing Sm and Fe can be efficiently reduced. Moreover, when the pretreatment temperature is not higher than 950° C., growth and segregation of the oxide particles can be inhibited so that the desired particle size can be maintained.

Reduction Step

In the reduction step, the partial oxide may be heat-treated in the presence of a reducing agent at a temperature of at least 920° C. but not higher than 1,200° C. to obtain alloy particles. For example, reduction may be performed by contacting the partial oxide with molten calcium or calcium vapor. In view of magnetic properties, the heat treatment temperature is preferably at least 950° C. but not higher than 1,150° C., more preferably at least 980° C. but not higher than 1,100° C. For a more uniform reduction reaction, the heat treatment time is preferably shorter than 120 minutes, more preferably shorter than 90 minutes. The lower limit of the heat treatment time is preferably 10 minutes or longer, more preferably 30 minutes or longer.

The metal calcium as a reducing agent may be used in the form of granules or powder and preferably has a particle size of not more than 10 mm. This can more effectively inhibit aggregation during the reduction reaction. Moreover, the metal calcium may be added in an amount that is 1.1 to 3.0 times, preferably 1.5 to 2.0 times the reaction equivalent (which is the stoichiometric amount needed to reduce the Sm oxide, but includes the amount needed to reduce Fe, if present in the form of an oxide).

In the reduction step, a disintegration accelerator may optionally be used together with the metal calcium as a reducing agent. The disintegration accelerator may be appropriately used to facilitate the disintegration or granulation of the product in the water washing step described later. Examples of the disintegration accelerator include alkaline earth metal salts such as calcium chloride and alkaline earth oxides such as calcium oxide. Such a disintegration accelerator may be used in an amount of 1 to 30% by mass, preferably 5 to 28% by mass, relative to the amount of the Sm oxide used as the Sm source.

Nitridation Step

In the nitridation step, the alloy particles obtained in the reduction step may be nitrided to obtain anisotropic magnetic particles. Since the alloy particles obtained in the reduction step are in porous bulk form due to the use of the particulate precipitate obtained in the precipitation step described above, they can be immediately nitrided by heat treatment in a nitrogen atmosphere without milling, thereby resulting in uniformnitridation.

The heat treatment temperature in the nitridation of the alloy particles (hereinafter, nitridation temperature) is preferably 300° C. to 600° C., particularly preferably 400° C. to 550° C., and the heat treatment may be performed within the above temperature range in an atmosphere substituted with nitrogen. The heat treatment time may be selected so that the alloy particles can be sufficiently uniformly nitrided.

The product obtained after the nitridation step may contain, in addition to the magnetic particles, materials such as by-product CaO and unreacted metallic calcium, which may be combined into sintered bulk form. In this case, the product may be introduced into cooling water to separate CaO and metallic calcium as a suspension of calcium hydroxide ($Ca(OH)_2$) from the magnetic particles. Further, the residual calcium hydroxide may be sufficiently removed by washing the magnetic particles with acetic acid or the like.

The SmFeN-based anisotropic magnetic powder may be a nitride having a $Th_2Zn_{17}$-type crystal structure and containing the rare earth metal samarium (Sm), iron (Fe), and nitrogen (N) as represented by the general formula: $Sm_xFe_{100-x-y}N_y$, preferably wherein x is at least 8.1 atom % but not more than 10 atom %; y is at least 13.5 atom % but not more than 13.9 atom %; and the balance is mainly Fe.

The average particle size of the SmFeN-based anisotropic magnetic powder is at least 2 μm but not more than 5 μm, preferably at least 2.5 μm but not more than 4.8 μm. When the average particle size is less than 2 μm, the amount of the magnetic powder filled in the bonded magnet tends to decrease, resulting in lower magnetization. When the average particle size is more than 5 μm, the bonded magnet tends to have a lower coercive force. Herein, the average particle size is measured under dry conditions using a laser diffraction particle size distribution analyzer.

The particle size D10 of the SmFeN-based anisotropic magnetic powder is at least 1 μm but not more than 3 μm, preferably at least 1.5 μm but not more than 2.5 μm. When the D10 is less than 1 μm, the amount of the magnetic powder filled in the bonded magnet tends to decrease, resulting in lower magnetization. Conversely, when the D10 is more than 3 μm, the bonded magnet tends to have a lower coercive force. Herein, the D10 is defined as the particle size corresponding to the 10th percentile of the cumulative particle size distribution by volume of the SmFeN-based anisotropic magnetic powder.

The particle size D50 of the SmFeN-based anisotropic magnetic powder is at least 2.5 μm but not more than 5 μm, preferably at least 2.7 μm but not more than 4.8 μm. When the D50 is less than 2.5 μm, the amount of the magnetic powder filled in the bonded magnet tends to decrease, resulting in lower magnetization. When the D50 is more than 5 μm, the bonded magnet tends to have a lower coercive force. Herein, the D50 is defined as the particle size corresponding to the 50th percentile of the cumulative particle size distribution by volume of the SmFeN-based anisotropic magnetic powder.

The particle size D90 of the SmFeN-based anisotropic magnetic powder is at least 3 μm but not more than 7 μm, preferably at least 4 μm but not more than 6 μm. When the D90 is less than 3 μm, the amount of the magnetic powder filled in the bonded magnet tends to decrease, resulting in lower magnetization. When the D90 is more than 7 μm, the bonded magnet tends to have a lower coercive force. Herein, the D90 is defined as the particle size corresponding to the 90th percentile of the cumulative particle size distribution by volume of the SmFeN-based anisotropic magnetic powder.

In view of coercive force, the SmFeN-based anisotropic magnetic powder has a below-defined span of not more than 2, preferably not more than 1.5:

$$\text{Span}=(D90-D10)/D50.$$

The circularity of the SmFeN-based anisotropic magnetic powder is not limited, but it is preferably at least 0.5, more preferably at least 0.6. When the circularity is less than 0.5, stress may occur between the particles during molding due to poor fluidity, thereby resulting in lower magnetic properties. Herein, the circularity can be determined by taking a SEM image at a magnification of 3,000, processing the image for binarization, and calculating the circularity of each particle. The circularity defined in the present disclosure refers to the average of the circularities obtained by measuring about 1,000 to 10,000 particles. In general, the larger the number of small size particles, the higher the circularity. Thus, particles having a particle size of 1 μm or more are measured for circularity. The circularity measurement uses the definitional equation: Circularity=4 $\pi S/L^2$, wherein S represents the area of the two-dimensional projection of the particle, and L represents the perimeter of the two-dimensional projection thereof.

Method of Producing Compound for Bonded Magnets

A method of producing a compound for bonded magnets according to the present embodiments includes providing the phosphate-coated SmFeN-based anisotropic magnetic powder according to the above embodiments and kneading the magnetic powder with a resin. The method further improves the coercive force. Moreover, the use of polypropylene as the resin further improves the hot water resistance. Here, the phosphate-coated SmFeN-based anisotropic magnetic powder may be obtained by the above-mentioned method.

Kneading Step

In the step of kneading the phosphate-coated SmFeN-based anisotropic magnetic powder with a resin, a mixture of the phosphate-coated SmFeN-based anisotropic magnetic powder and a resin may be kneaded using a kneading machine such as a single screw kneader or a twin screw kneader at 180° C. to 300° C. For example, a pellet-shaped compound for bonded magnets may be obtained by mixing the magnetic powder and a resin powder in a mixer, followed by extruding a strand with a twin screw extruder, cooling the strand in the air, and then cutting the cooled strand into several millimeters using a pelletizer.

When the resin used is polypropylene, the weight average molecular weight of the polypropylene is preferably within the range of at least 20,000 but not more than 200,000. When the weight average molecular weight is less than 20,000, the molded bonded magnet tends to have a lower mechanical strength. When the weight average molecular weight is more than 200,000, the compound for bonded magnets tends to have a higher viscosity. Moreover, to improve bonding to the magnetic powder subjected to coupling treatment, the polypropylene is preferably acid-modified. For example, polypropylene acid-modified by maleic anhydride may be suitably used. The degree of acid modification of the polypropylene is preferably at least 0.1% by mass but not higher than 10% by mass. When the degree is lower than 0.1% by mass, adhesion to the magnetic powder may be insufficient, so that the bonded magnet may have lower mechanical strength and water resistance. When the degree is higher than 10% by mass, the resin may have a higher water absorption rate, thus reducing the water resistance of the bonded magnet.

The amount of the phosphate-coated SmFeN-based anisotropic magnetic powder in the compound for bonded magnets is preferably at least 80% by mass but not more than 95% by mass. To obtain high magnetic properties, the amount is more preferably at least 90% by mass but not more than 95% by mass. Moreover, the amount of the resin in the compound for bonded magnets is preferably at least 3% by mass but not more than 20% by mass. To ensure fluidity, the amount is more preferably at least 5% by mass but not more than 15% by mass.

In addition to the phosphate-coated SmFeN-based anisotropic magnetic powder and the resin, a thermoplastic elastomer and/or an antioxidant such as a phosphorus antioxidant may be simultaneously kneaded. The mass ratio of the resin to the thermoplastic elastomer, if present, is within the range of 90:10 to 50:50. In view of impact resistance, the mass ratio is more preferably within the range of 89:11 to 70:30. Moreover, the amount of the phosphorus antioxidant, if present, in the compound for bonded magnets is preferably at least 0.1% by mass but not more than 2% by mass.

Examples of resins usable in a compound for water-resistant bonded magnets include, in addition to the above-mentioned polypropylene (PP), polyphenylene sulfide (PPS), polyether ether ketone (PEEK), liquid crystal polymers (LCP), polyamide (PA), polyethylene (PE), and other crystalline resins having a low water absorption rate.

A mixture or polymer alloy of any of the crystalline resins and a non-crystalline resin having a glass transition temperature (Tg) of 100° C. or higher, such as modified polyphenylene ether (m-PPE), cyclic olefin polymers (COP), or cyclic olefin copolymers (COC) may be used to improve hot water resistance. For example, a polymer alloy of a modified polyphenylene ether (m-PPE) and polypropylene may be suitably used in the present disclosure.

Compound for Bonded Magnets

A compound for bonded magnets according to the present embodiments contains the phosphate-coated SmFeN-based anisotropic magnetic powder according to the above-mentioned embodiments and a resin. The compound for bonded magnets containing the phosphate-coated SmFeN-based anisotropic magnetic powder according to the above-mentioned embodiments and a resin can be used to produce a bonded magnet having an enhanced coercive force. Here, the compound for bonded magnets can be produced by the above-mentioned method.

Method of Producing Bonded Magnet

A bonded magnet may be produced using the compound for bonded magnets and an appropriate molding machine. Specifically, for example, a bonded magnet may be produced by melting the compound for bonded magnets in the barrel of a molding machine and injection-molding the molten compound into a mold in which a magnetic field is applied to align the easy axes of magnetization (orientation step), followed by cooling for solidification and then magnetization with an air core coil or a magnetizing yoke (magnetization step).

The temperature of the barrel may be selected depending on the type of resin used and may be 160° C. to 320° C. Similarly, the temperature of the mold may be 30° C. to 150° C., for example. The orientation field in the orientation step may be generated using an electromagnet or permanent magnet, and the magnitude of the magnetic field is preferably at least 4 kOe, more preferably at least 6 kOe. Moreover, the magnitude of the magnetizing field in the magnetization step is preferably at least 20 kOe, more preferably at least 30 kOe.

Bonded Magnet

A bonded magnet according to the present embodiments contains the phosphate-coated SmFeN-based anisotropic magnetic powder according to the above-mentioned embodiments and a resin. When such a bonded magnet is maintained under conditions in which it is immersed in hot water at 120° C. for 1,000 hours, the total flux of the resulting bonded magnet may be maintained at a ratio of at least 95% of that before the test. If the total flux of the bonded magnet after a hot water resistance test in which the bonded magnet is maintained under conditions in which it is immersed in hot water at 120° C. for 1,000 hours is at least 95%, preferably at least 96%, more preferably at least 97%, of the total flux before the test, this means that the bonded magnet has high resistance to hot water. Here, the total flux may be determined, for example, by measuring the change in magnetic flux in a search coil using a flux meter (Nihon Denji Sokki Co, Ltd., model: NFX-1000) when the molded bonded magnet placed within the search coil is pulled out of the search coil. Moreover, the bonded magnet can be produced by the above-mentioned method.

The bonded magnet according to the present embodiments is resistant to hot water and is therefore suitable for use in the driving sources of fuel pumps for automobiles, motorcycles, or other vehicles or in water pumps.

EXAMPLES

Example 1

An amount of 5.0 kg of $FeSO_4.7H_2O$ was mixed and dissolved in 2.0 kg of pure water. To the mixture were further added 0.49 kg of $Sm_2O_3$ and 0.74 kg of 70% sulfuric acid, and they were well stirred and completely dissolved. Next, pure water was added to the resulting solution so that the final Fe and Sm concentrations were adjusted to 0.726 mol/L and 0.112 mol/L, respectively, to obtain a Sm—Fe sulfate solution.

Precipitation Step

The entire amount of the prepared Sm—Fe sulfate solution was added dropwise with stirring to 20 kg of pure water kept at a temperature of 40° C. over 70 minutes from the start of the reaction, while simultaneously dropwise adding a 15% ammonia aqueous solution to adjust the pH to 7 to 8. Thus, a slurry containing a Sm—Fe hydroxide was obtained. The slurry was washed with pure water by decantation. Then, solid-liquid separation was performed to separate the hydroxide. The separated hydroxide was dried in an oven at 100° C. for 10 hours.

Oxidation Step

The hydroxide obtained in the precipitation step was fired in the air at 1,000° C. for one hour. After cooling, a red Sm—Fe oxide as a raw material powder was obtained.

Pretreatment Step

An amount of 100 g of the Sm—Fe oxide was put in a steel container to a thickness of 10 mm. The container was placed in a furnace, and the pressure was reduced to 100 Pa. Then, while introducing hydrogen gas, the temperature was increased to a pretreatment temperature of 850° C. and maintained at this temperature for 15 hours. The oxygen concentration was measured by non-dispersive infrared spectroscopy (ND-IR) (EMGA-820, Horiba, Ltd.) and found to be 5% by mass. The results show that a black partial oxide was obtained in which the oxygen bonded to Sm remained unreduced while 95% of the oxygen bonded to Fe was reduced.

Reduction Step

An amount of 60 g of the partial oxide obtained in the pretreatment step was mixed with 19.2 g of metallic calcium having an average particle size of about 6 mm, and the mixture was placed in a furnace. After vacuum evacuation of the furnace, argon gas (Ar gas) was introduced into the furnace. The temperature inside the furnace was increased to 1,045° C. and maintained for 45 minutes to obtain Fe—Sm alloy particles.

Nitridation Step

Subsequently, the temperature inside the furnace was lowered to 100° C., followed by vacuum evacuation. Then, while introducing nitrogen gas, the temperature was increased to 450° C. and maintained at this temperature for 23 hours to obtain a magnetic particle-containing bulk product.

Water Washing Step

The bulk product obtained in the nitridation step was introduced into 3 kg of pure water and stirred for 30 minutes. After standing still, the supernatant was drained by decantation. The introduction into pure water, stirring, and decantation were repeated 10 times. Next, 2.5 g of 99.9% acetic acid was introduced and stirred for 15 minutes. After standing still, the supernatant was drained by decantation. The introduction into pure water, stirring, and decantation were repeated twice, followed by dehydration, drying, and then mechanical crushing to obtain a SmFeN-based anisotropic magnetic powder (average particle size 3 μm).

Phosphate Treatment Step

A phosphate treatment liquid and cerium chloride were prepared. The phosphate treatment liquid was prepared by mixing 85% orthophosphoric acid, sodium dihydrogen phosphate, and sodium molybdate dihydrate at a mass ratio of 1:6:1 and adding pure water and dilute hydrochloric acid to adjust the pH and the $PO_4$ concentration to 2 and 20% by mass, respectively. The process up to the water washing step was performed in multiple batches, followed by mixing the resulting batches of SmFeN-based anisotropic magnetic powder to obtain a slurry containing 1,000 g of the SmFeN-based anisotropic magnetic powder. To the slurry was added dilute hydrochloric acid containing 70 g of hydrogen chloride, and they were stirred for one minute to remove the oxidized surface film and contaminants, followed by repeating draining and filling of water until the supernatant had a conductivity of not higher than 100 μS/cm. Thus, a slurry containing 10% by mass of the SmFeN-based anisotropic magnetic powder was obtained. While stirring the slurry, 3.7 g of cerium chloride ($CeCl_3$) was entirely introduced into the treatment tank, and the mixture was maintained for 30 minutes while adjusting the pH to 5 to 8 using sodium hydroxide. Thus, a cerium compound containing cerium hydroxide ($Ce(OH)_3$) was precipitated on the surface of the magnetic powder. Next, 100 g of the prepared phosphate treatment liquid was entirely introduced into the treatment tank, and then the phosphating reaction slurry was maintained for 30 minutes while introducing 6% by mass hydrochloric acid as needed to control the pH within the range of 2.5±0.1. Subsequently, the reaction slurry was subjected to suction filtration, dehydration, and vacuum drying to obtain a cerium-containing phosphate-coated SmFeN-based anisotropic magnetic powder. The amount of cerium in the magnetic powder when a cerium compound containing cerium hydroxide was precipitated on the surface of the magnetic powder was 0.05% by mass. The amount of cerium in the magnetic powder after the phosphate treatment was also 0.05% by mass. This indicates that most of the cerium in the cerium compound previously precipitated on the surface of the magnetic powder still remained after the phosphate treatment.

Oxidation Step after Phosphate Treatment

The temperature of 1,000 g of the cerium-containing phosphate-coated SmFeN-based anisotropic magnetic powder was gradually raised in an atmosphere of a gas mixture of nitrogen and air (oxygen concentration: 4%, 5 l/min) from room temperature to a maximum temperature of 230° C. at which heat treatment was performed for 8 hours to obtain an oxidized phosphate-coated SmFeN-based anisotropic magnetic powder.

Example 2

An oxidized, rare earth element-containing phosphate-coated SmFeN-based anisotropic magnetic powder was obtained as in Example 1, except that the amount of cerium chloride was changed to 7.4 g.

Example 3

An oxidized, rare earth element-containing phosphate-coated SmFeN-based anisotropic magnetic powder was obtained as in Example 1, except that the amount of cerium chloride was changed to 15.2 g.

Example 4

An oxidized, rare earth element-containing phosphate-coated SmFeN-based anisotropic magnetic powder was obtained as in Example 1, except that the cerium chloride used was changed to 2.2 g of samarium chloride ($SmCl_3$).

Example 5

An oxidized, rare earth element-containing phosphate-coated SmFeN-based anisotropic magnetic powder was obtained as in Example 1, except that the cerium chloride used was changed to 4.4 g of samarium chloride.

Example 6

An oxidized, rare earth element-containing phosphate-coated SmFeN-based anisotropic magnetic powder was obtained as in Example 1, except that the cerium chloride used was changed to 4.4 g of neodymium chloride ($NdCl_3$).

Example 7

An oxidized, rare earth element-containing phosphate-coated SmFeN-based anisotropic magnetic powder was obtained as in Example 1, except that the cerium chloride used was changed to 8.8 g of neodymium chloride.

Example 8

An oxidized, rare earth element-containing phosphate-coated SmFeN-based anisotropic magnetic powder was obtained as in Example 1, except that the cerium chloride used was changed to 4.5 g of dysprosium chloride ($DyCl_3$).

Example 9

An oxidized, rare earth element-containing phosphate-coated SmFeN-based anisotropic magnetic powder was obtained as in Example 1, except that the cerium chloride used was changed to 9.0 g of dysprosium chloride.

Reference Example

An oxidized phosphate-coated SmFeN-based anisotropic magnetic powder was obtained as in Example 1, except that the addition of cerium chloride and sodium hydroxide was not performed, and the precipitation of a cerium compound was not performed.

Comparative Example 1

The same process up to the water washing step as in Example 1 was performed to obtain a magnetic powder. A phosphate treatment liquid was prepared by mixing 85% orthophosphoric acid, sodium dihydrogen phosphate, and sodium molybdate dihydrate at a mass ratio of 1:6:1 and adding pure water and dilute hydrochloric acid to adjust the pH and the P04 concentration to 2.5 and 20% by mass, respectively. The slurry containing 1,000 g of the SmFeN-based anisotropic magnetic powder obtained in the water washing step was stirred in dilute hydrochloric acid containing 70 g of hydrogen chloride for one minute to remove the oxidized surface film and contaminants, followed by repeating draining and filling of water until the supernatant had a conductivity of not higher than 100 S/cm. Thus, a slurry containing 10% by mass of the SmFeN-based anisotropic magnetic powder was obtained. While stirring the slurry, 100 g of the prepared phosphate treatment liquid was entirely introduced into the treatment tank. The pH of the phosphating reaction slurry rose from 2.5 to 6 over 5 minutes. After stirring for 15 minutes, the reaction slurry was subjected to suction filtration, dehydration, and vacuum drying to obtain a phosphate-coated SmFeN-based anisotropic magnetic powder.

Comparative Example 2

Reduction Step 2

A crucible was charged with a powder mixture of 52.5 g of an iron powder having an average particle size (D50) of about 50 μm, 21.3 g of a samarium oxide powder having an average particle size (D50) of 3 μm, and 10.5 g of metallic calcium, and then put in a furnace. After vacuum evacuation of the furnace, argon gas (Ar gas) was introduced into the furnace. The temperature was increased to 1,150° C. and maintained for 5 hours to obtain Fe—Sm alloy particles.

Nitridation Step 2

Subsequently, the Fe—Sm alloy particles were heat-treated in an ammonium/hydrogen gas mixture at 420° C. for 23 hours to obtain a magnetic particle-containing bulk product.

Water Washing Step 2

The bulk product obtained in the nitridation step was introduced into 3 kg of pure water and stirred for 30 minutes. After standing still, the supernatant was drained by decantation. The introduction into pure water, stirring, and decantation were repeated 10 times. Next, 2.5 g of 99.9% acetic acid was introduced and stirred for 15 minutes. After standing still, the supernatant was drained by decantation. The introduction into pure water, stirring, and decantation were repeated twice. Then, dehydration and drying were performed to obtain a SmFeN-based anisotropic magnetic powder (average particle size: 30 μm).

Phosphate Treatment Step 2

An amount of 15 g of the obtained magnetic powder together with 0.44 g of a 85% orthophosphoric acid aqueous solution, 100 mL of isopropanol (IPA), and 200 g of alumina beads with a diameter of 10 mm were sealed in a glass bottle and then subjected to milling in a vibration ball mill for 120 minutes. Subsequently, the slurry was filtered and then vacuum dried at 100° C. to obtain a phosphate-coated SmFeN-based anisotropic magnetic powder (average particle size: 1.5 μm) of Comparative Example 2.

Evaluation of Magnetic Powder

Intrinsic Coercive Force, iHc, of Magnetic Powder

The magnetic properties (intrinsic coercive force, iHc) of the magnetic powders obtained in Examples 1 to 9, Reference Example, and Comparative Examples 1 and 2 were measured using a vibrating—sample magnetometer (VSM, Riken Denshi Co., Ltd., model: BHV-55). The measurement of the intrinsic coercive force, iHc, was performed before the oxidation, after the oxidation, and after a water resistance test in which the magnetic powder was immersed in water at 100° C. for 8 hours. A percentage of iHe reduction caused by the water resistance test was calculated from the intrinsic coercive forces, iHc, after the oxidation and after the water resistance test. Table 1 shows the measurement results of the magnetic powders before the oxidation. Table 2 shows the measurement results of the magnetic powders after the oxidation.

Amount of Attached $PO_4$

The phosphorus concentration of the magnetic powders obtained in Examples 1 to 9, Reference Example, and Comparative Examples 1 and 2 was measured by ICP atomic emission spectroscopy (ICP-AES) and converted to a phosphate ion ($PO_4$) concentration. Table 1 shows the results.

Amount of Attached Rare Earth Element

The rare earth element concentration of the magnetic powders obtained in Examples 1 to 9, Reference Example, and Comparative Examples 1 and 2 was measured by ICP atomic emission spectroscopy (ICP-AES) to determine the amount of the attached rare earth element. Tables 1 and 2 show the results. Here, as for Examples 4 and 5 in which Sm was used as a rare earth element, the amount was determined from the results of ICP atomic emission spectroscopy as follows. In Reference Example, Example 4, and Example 5, the amount of Sm added was confirmed to correlate with the ratio of the amounts of Sm and Fe determined by ICP atomic emission spectroscopy. Thus, the amount of samarium added in the addition of samarium chloride was regarded as the amount of the attached rare earth element.

DSC Exothermic Onset Temperature

The exothermic onset temperature was measured by weighing 20 mg of the magnetic powder obtained in each of Examples 1 to 9, Reference Example, and Comparative Examples 1 and 2, and subjecting it to DSC analysis using a high-temperature differential scanning calorimeter (DSC6300, Hitachi High-Tech Science Corporation) under measurement conditions including an air atmosphere (200 mL/min), a temperature rise from room temperature to 400° C. (rate of temperature rise: 20° C./min), and alumina (20 mg) as reference. Table 1 shows the results of DSC analysis. A higher exothermic onset temperature indicates less heat generation caused by oxidation, meaning that a denser phosphate coating is formed.

αFe Peak Height Ratio

The XRD pattern of the magnetic powder obtained in Examples 1 to 9, Reference Example, and Comparative Examples 1 and 2 was measured using a powder X-ray crystal diffraction instrument (Rigaku Corporation, X-ray wavelength: CuKa1). Then, the diffraction peak intensity of the (110) plane of αFe was divided by the diffraction peak intensity of the (300) plane of $Sm_2Fe_{17}N_3$ and then multiplied by 10,000 to obtain a value as an αFe peak height ratio. Table 1 shows the results. A lower αFe peak height ratio means a smaller amount of αFe as an impurity.

Total Carbon Content

The total carbon (TC) content of the magnetic powders obtained in Examples 1 to 9, Reference Example, and Comparative Examples 1 and 2 was measured using a combustion catalytic oxidation-type total organic carbon (TOC) analyzer (Shimadzu Corporation, model: SSM-5000A). Table 1 shows the results.

TABLE 1

| | Treatment solvent | pH adjustment during phosphate treatment | Rare earth element | Magnetic powder after phosphate treatment iHc kOe | Amount of attached $PO_4$ wt % | Amount of attached rare earth element wt % | DSC exothermic onset temperature ° C. | αFe peak height ratio (110/300) | TC (ppm) |
|---|---|---|---|---|---|---|---|---|---|
| Example 1 | Water | 2.5 | Ce | 20.4 | 1.2 | 0.05 | 208.7 | 66 | 280 |
| Example 2 | Water | 2.5 | Ce | 19.8 | 1.3 | 0.13 | 209.4 | 43 | 240 |
| Example 3 | Water | 2.5 | Ce | 19.8 | 1.5 | 0.25 | 210.5 | 43 | 250 |
| Example 4 | Water | 2.5 | Sm | 21.2 | 1.4 | 0.13 | 208.7 | 74 | 340 |
| Example 5 | Water | 2.5 | Sm | 21.0 | 1.6 | 0.25 | 211.0 | 62 | 420 |
| Example 6 | Water | 2.5 | Nd | 21.2 | 1.2 | 0.07 | 210.9 | 44 | 310 |
| Example 7 | Water | 2.5 | Nd | 21.2 | 1.6 | 0.24 | 212.2 | 59 | 370 |
| Example 8 | Water | 2.5 | Dy | 19.9 | 1.4 | 0.10 | 209.1 | 37 | 210 |
| Example 9 | Water | 2.5 | Dy | 20.4 | 1.6 | 0.23 | 210.6 | 68 | 240 |
| Reference Example | Water | 2.5 | — | 19.8 | 1.0 | 0.00 | 210.1 | 41 | 280 |
| Comparative Example 1 | Water | No pH adjustment (2.5→6) | — | 14.7 | 0.5 | 0.00 | 158.2 | 229 | 280 |
| Comparative Example 2 | IPA | No pH adjustment | — | 12.3 | 1.7 | 0.00 | 100.6 | 259 | 1300 |

TABLE 2

| | Rare earth element | Amount of attached rare earth element wt % | Oxidation temperature ° C. | Magnetic powder after oxidation iHc kOe after oxidation | iHc kOe after water resistance test | % of iHc reduction after water resistance test |
|---|---|---|---|---|---|---|
| Example 1 | Ce | 0.05 | 230 | 18.6 | 17.8 | 4.1 |
| Example 2 | Ce | 0.13 | 230 | 18.4 | 17.6 | 4.3 |
| Example 3 | Ce | 0.25 | 230 | 18.5 | 17.0 | 8.0 |
| Example 4 | Sm | 0.13 | 230 | 19.2 | 18.6 | 2.9 |
| Example 5 | Sm | 0.25 | 230 | 18.9 | 16.8 | 11.0 |
| Example 6 | Nd | 0.07 | 230 | 19.0 | 18.4 | 3.4 |
| Example 7 | Nd | 0.24 | 230 | 19.0 | 16.7 | 12.2 |
| Example 8 | Dy | 0.10 | 230 | 18.0 | 17.1 | 4.9 |
| Example 9 | Dy | 0.23 | 230 | 18.9 | 17.7 | 6.5 |
| Reference Example | — | 0.00 | 230 | 18.1 | 17.0 | 6.1 |

The results in Table 1 demonstrate that the magnetic powders with a rare earth element attached thereto tend to have a higher coercive force. Moreover, the results in Table 2 demonstrate that the magnetic powders with not more than 0.2% by mass of the attached rare earth element obtained in Examples 1, 2, 4, 6, and 8 exhibited improved hot water resistance after the oxidation as compared to the magnetic powder of Reference Example.

What is claimed is:

1. A method of producing a phosphate-coated SmFeN-based anisotropic magnetic powder, the method comprising performing a phosphate treatment comprising adding an inorganic acid to a slurry containing a SmFeN-based anisotropic magnetic powder, water, a phosphate compound, and a rare earth compound containing a rare earth element so that the slurry is adjusted to have a pH of at least 1 and not higher than 4.5 to obtain a phosphate-coated SmFeN-based anisotropic magnetic powder having a surface coated with a phosphate, and after the phosphate treatment, heat-treating the phosphate-coated SmFeN-based anisotropic magnetic powder at a temperature of at least 150° C. but not higher than 330° C. in an oxygen-containing atmosphere, wherein the rare earth compound is at least one compound selected from the group consisting of a rare earth hydroxide, a rare earth chloride, a rare earth sulfate, a rare earth nitrate, a rare earth acetate, and a combination thereof, and wherein the solvent of the slurry is water.

2. The method according to claim 1, wherein an amount of the rare earth element contained in the rare earth compound is 0.25% by mass or less relative to the mass of the phosphate-coated SmFeN-based anisotropic magnetic powder.

3. The method according to claim 1, wherein the rare earth compound comprises a rare earth hydroxide represented by the following formula (1):

$$R\text{—}(OH)_x \quad (1),$$

wherein R is Ce, Nd, Sm, or Dy, and x is 1, 2, 3, or 4.

4. The method according to claim 3,
wherein the rare earth hydroxide is at least one selected from the group consisting of $Ce(OH)_3$, $Nd(OH)_3$, $Sm(OH)_3$, and $Dy(OH)_3$.

5. The method according to claim 1,
wherein the phosphate-coated SmFeN-based anisotropic magnetic powder has a phosphate content of higher than 0.5% by mass.

6. The method according to claim 3,
wherein the phosphate-coated SmFeN-based anisotropic magnetic powder has a phosphate content of higher than 0.5% by mass.

7. The method according to claim 1,
wherein in the phosphate treatment, the slurry is adjusted to have the pH of at least 1 and not higher than 4.5 for at least 10 minutes.

8. The method according to claim 3,
wherein in the phosphate treatment, the slurry is adjusted to have the pH of at least 1 and not higher than 4.5 for at least 10 minutes.

9. The method according to claim 1,
wherein in the phosphate treatment, the slurry is adjusted to have the pH of at least 1.6 and not higher than 3.9.

10. The method according to claim 3,
wherein in the phosphate treatment, the slurry is adjusted to have the pH of at least 1.6 and not higher than 3.9.

11. The method according to claim 1,
wherein in the phosphate treatment, the phosphate compound includes an inorganic phosphate compound.

12. The method according to claim 3,
wherein in the phosphate treatment, the phosphate compound includes an inorganic phosphate compound.

13. The method according to claim 1,
comprising mixing the SmFeN-based anisotropic magnetic powder, water, and the rare earth compound to obtain a mixture, and then adding an aqueous phosphate solution containing the phosphate compound to the mixture to prepare the slurry, prior to the phosphate treatment.

14. The method according to claim 1,
wherein the inorganic acid is added to the slurry as needed so that the slurry is adjusted to have a pH of at least 1 and not higher than 4.5 during the phosphate treatment.

15. The method according to claim 1,
wherein the rare earth element contained in the rare earth compound is at least one selected from the group consisting of Ce, Sm, Nd, and Dy.

16. A method of producing a phosphate-coated SmFeN-based anisotropic magnetic powder, the method comprising
performing a phosphate treatment comprising adding an inorganic acid to a slurry containing a SmFeN-based anisotropic magnetic powder, water, a phosphate compound, and a rare earth compound containing a rare earth element so that the slurry is adjusted to have a pH of at least 1 and not higher than 4.5 to obtain a phosphate-coated SmFeN-based anisotropic magnetic powder having a surface coated with a phosphate, and
after the phosphate treatment, heat-treating the phosphate-coated SmFeN-based anisotropic magnetic powder at a temperature of at least 150° C. but not higher than 330° C. in an oxygen-containing atmosphere,
wherein the rare earth compound is at least one compound that can generate rare earth ions in a slurry containing water as a solvent, or a combination thereof, and
wherein the solvent of the slurry is water.

17. The method according to claim 16,
wherein the rare earth element contained in the rare earth compound is at least one selected from the group consisting of Ce, Sm, Nd, and Dy.

* * * * *